United States Patent [19]

Azzarello et al.

[11] Patent Number: 4,862,971
[45] Date of Patent: Sep. 5, 1989

[54] SWAY LIMITING MEANS FOR A TRACTOR HITCH

[75] Inventors: Joseph A. Azzarello, Palo Heights; Carlos T. San Luis, Villa Park, both of Ill.; Gerald L. Wagenbach, Burlington, Iowa

[73] Assignee: J. I. Case Company, Racine, Wis.

[21] Appl. No.: 246,265

[22] Filed: Sep. 19, 1988

[51] Int. Cl.[4] .......................................... A01B 59/041
[52] U.S. Cl. ..................................... 172/450; 280/474
[58] Field of Search ................. 172/450, 449, 439; 280/474

[56] References Cited

U.S. PATENT DOCUMENTS

| | | | |
|---|---|---|---|
| 2,935,147 | 5/1960 | Edman et al. | 172/450 |
| 3,056,458 | 10/1962 | Gray | 172/450 |
| 3,709,304 | 1/1973 | Haupt | 172/450 |
| 3,888,316 | 6/1975 | Azzarello et al. | 172/450 |
| 3,910,355 | 10/1975 | Elfes et al. | 172/450 |
| 4,236,724 | 12/1980 | Schillings | 172/450 |
| 4,640,522 | 3/1987 | Teich | 172/450 |
| 4,650,206 | 3/1987 | Mathis | 172/450 |

FOREIGN PATENT DOCUMENTS

| | | |
|---|---|---|
| 1221833 | 7/1966 | Fed. Rep. of Germany ...... 172/450 |
| 289728 | 8/1984 | Italy . |
| 576274 | 3/1946 | United Kingdom . |
| 622166 | 8/1949 | United Kingdom . |
| 647622 | 12/1950 | United Kingdom . |
| 807562 | 1/1959 | United Kingdom . |
| 914471 | 1/1963 | United Kingdom . |
| 1049469 | 11/1966 | United Kingdom . |
| 1174622 | 12/1969 | United Kingdom . |
| 1401551 | 2/1973 | United Kingdom . |
| 1582259 | 1/1977 | United Kingdom . |
| 1500179 | 2/1978 | United Kingdom . |
| 2103064 | 2/1983 | United Kingdom . |
| 2166334 | 10/1984 | United Kingdom . |

Primary Examiner—Richard J. Johnson
Attorney, Agent, or Firm—Dressler, Goldsmith, Shore, Sutker & Milnamow, Ltd.

[57] ABSTRACT

A sway limiting apparatus for a tractor hitch assembly including draft links which are vertically movable between a lower operative position and an upper transport position. The sway limiting apparatus includes a telescopic linkage assembly whose operative effectiveness in limiting lateral sway of the hitch assembly is controlled by a cam defining a cam profile. The cam profile and the linkage assembly cooperate to normally control lateral sway of the hitch assembly as a function of the vertical position of a draft link relative to the horizontal.

22 Claims, 6 Drawing Sheets

SWAY LIMITING MEANS FOR A TRACTOR HITCH

FIELD OF THE INVENTION

The present, invention generally relates to a hitch assembly for agricultural tractors and the like and, more particularly, to an apparatus for limiting lateral sway of such a hitch assembly.

BACKGROUND OF THE INVENTION

Agricultural tractors commonly employ a three point hitch assembly for connecting an agricultural implement to the tractor. The hitch assembly includes two laterally spaced lower draft links. The draft links are universally connected at their forward ends to the tractor. The lateral dimension between the rear ends of the draft links is controlled by the length of the agricultural implement. A power lift apparatus raises and lowers the draft links about their pivotal connection with the tractor between a lower operative position and an upper transport position.

Under some conditions, lateral or side to side sway of a farm implement relative to the tractor is desirable As an example, lateral movement of an implement may benefit tractor steering conditions such as at the end of a crop row. Under plowing conditions, where the attached implement continues to work the soil, side sway or lateral movement of the implement is particularly desirable to avoid large rocks or other obstacles in the soil. The extent of side sway or lateral movement must, however, be controlled and limited to prevent interference of the draft links with the rear wheels of the tractor.

On the other hand, there are working conditions when the implement is in its lower operative position that it is desirable to prevent lateral sway of the implement relative to the tractor. Working conditions such as planting and cultivating require that the implement follows the path of the tractor and be prevented from swaying from side-to-side. Moreover, it is desirable that side sway of the implement is completely abated when the implement is raised into its transport position to provide an arrangment that is stable and safe for transporting purposes.

Various types of sway limiting devices have been proposed for use with three point hitch assemblies. Commonly used in the U.S. agricultural market are devices involving the use of removable rub blocks carried by the draft links. The rub blocks act in cooperation with fixed sway preventing means on the tractor.

Although European standards exist, agricultural implements in European markets usually vary in length according to the particular manufacturer. As such, the lateral distance between the draft links varies depending upon which implement is being used. Accordingly, multiple piece removable rub means normally used in the U. S. are not readily adaptable to the European agricultural market.

In Europe it is known to use a stabilizer assembly between the tractor and the draft link. A common stabilizer assembly includes a multi-piece telescopic structure having one piece connected to the draft link and the other piece connected to the tractor. The stabilizer operates in a free or locked condition. Depending on the design of the stabilizer assembly, when the draft links are in their lower operative position, the stabilizer assembly permits telescopic movement of the pieces relative to each other. Alternatively, the pieces of the stabilizer assembly are locked against longitudinal movement relative to one another upon rearrangement of the stabilizer assembly.

In one form, a bolt latching mechanism is used to secure the parts of the stabilizer to each other. The bolt latching mechanism consists of a pin or bolt which is movable transversely of the longitudinal axis of the telescopic structure. The bolt is guided through holes which are in alignment with one another and which are formed in the pieces of the telescopic structure. Operator intervention is required to selectively operate the stabilizer assembly in either its free condition or its locked condition.

Raising and lowering of the implement is commonly effected from a control console or panel which is readily accessible to the operator. It would be beneficial, therefore, to provide a mechanism that can be automatically locked and unlocked to prevent sway of the implement without requiring the operator to get off the tractor to perform either the locking or unlocking function for the hitch assembly.

SUMMARY OF THE INVENTION

In view of the above, and in accordance with the present invention, there is provided a sway limiting means for a tractor hitch assembly. The sway limiting means of the present invention includes a telescopic linkage assembly whose operative effectiveness in limiting lateral sway of the draft links of the hitch assembly is controlled by a cam defining a cam profile. The cam profile and linkage assembly cooperate to normally control lateral sway of the hitch assembly as a function of its vertical position relative to the tractor.

According to one aspect of the present invention, there is provided a sway limiting means for a tractor hitch having a draft link mounted on a tractor frame for vertical movement about a transverse axis between a lower operative position and an upper transport position. The draft link is also mounted for lateral sway in a plane passing through the transverse axis. The sway limiting means is disposed between the tractor and the draft link. The sway limiting means includes, in combination, a linkage assembly and cam means.

The linkage assembly includes a pair of links which are movable through a limited range relative to each other and are arranged telescopically one within the other. One link is connected to the draft link. The other link is connected to the tractor.

The cam means is likewise connected to the tractor and defines opposed cam surfaces. The cam surfaces cooperate with the link assembly to allow lateral movement of the draft link in its lower operative position and automatically prevents lateral movement of the draft link in its upper transport position.

In a preferred form of the invention, the sway limiting means further includes means for selectively locking the links of the linkage assembly to each other. Such selective locking means includes a linchpin which passes transversely through the linkage assembly to prevent lateral movement of the draft link in its lower operative position.

In a preferred form, the linkage assembly of the sway limiting means further includes limiting means for interconnecting the links and limiting their lengthwise movement relative to each other. Such limiting means includes a slot and pin arrangement defined by the links of the linkage assembly. The movement of the links relative to each other is limited by the axial length of the slot defined by one link.

The cam means preferably includes a pair of bifurcated arms which are pivotally connected to the tractor. In one embodiment, a ball and socket arrangement is provided to pivotally connect the cam means to the tractor so as to provide lateral swinging movement of the cam means. Each arm of the cam means defines an elongated vertical slot. Opposite sides of the slot define cam surfaces which cooperate with the limiting means to control lateral sway of the draft link. One cam surface controls lateral sway of the draft link in one direction and the opposite cam surface limits lateral sway of the draft link in the opposite direction.

The cam means defines either a closed elongated slot or an open elongated slot. Opposite sides of either elongated slot converge in an upward vertical direction.

To accommodate "odd" agricultural implements, the linkage assembly of the present invention further includes means for adjusting the sway limiting apparatus. Such means includes a pivotal attachment disposed at one end of the links for effecting a fine adjustment thereof. As such, the operative length of the linkage assembly can be modulated to accommodate differences in width between the draft links.

According to another aspect of the present invention, the sway limiting apparatus includes a pair of stabilizer assemblies. Each stabilizer assembly is connected to and between the tractor and one of the draft links. Each stabilizer assembly comprises an elongated tubular sleeve having an arm telescopically slidable within and relative to the sleeve. Cam means, connected to the tractor, defines a cam surface which coact with the arm to allow lateral movement of the draft link in its lower operative position and prevents lateral sway of the draft link in its upper transport position.

In one form of the invention, each arm of the stabilizer assembly has an arcuate shaped end which moves along the cam surface of the cam means when the draft link is moved from its lower position to its upper position.

In another form of the invention, each stabilizer assembly includes means for limiting the telescopic movement of the arm relative to the sleeve. Such limiting means cooperates with the cam surface to automatically regulate sway of the draft links. By such construction, the lateral sway of the implement is automatically regulated as a function of the disposition of the draft links.

Other features and advantages of the present invention will become readily apparent from the following detailed description, the appended drawings, and the accompanying claims.

DETAILED DESCRIPTION

While the present invention is susceptible of embodiment in various forms, there is shown in the drawings presently preferred embodiments of the invention which are hereinafter described, with the understanding that the present disclousre is to be considered as an exemplification of the invention, and is not intended to limit the invention to the specific embodiments illustrated.

Figure 1:
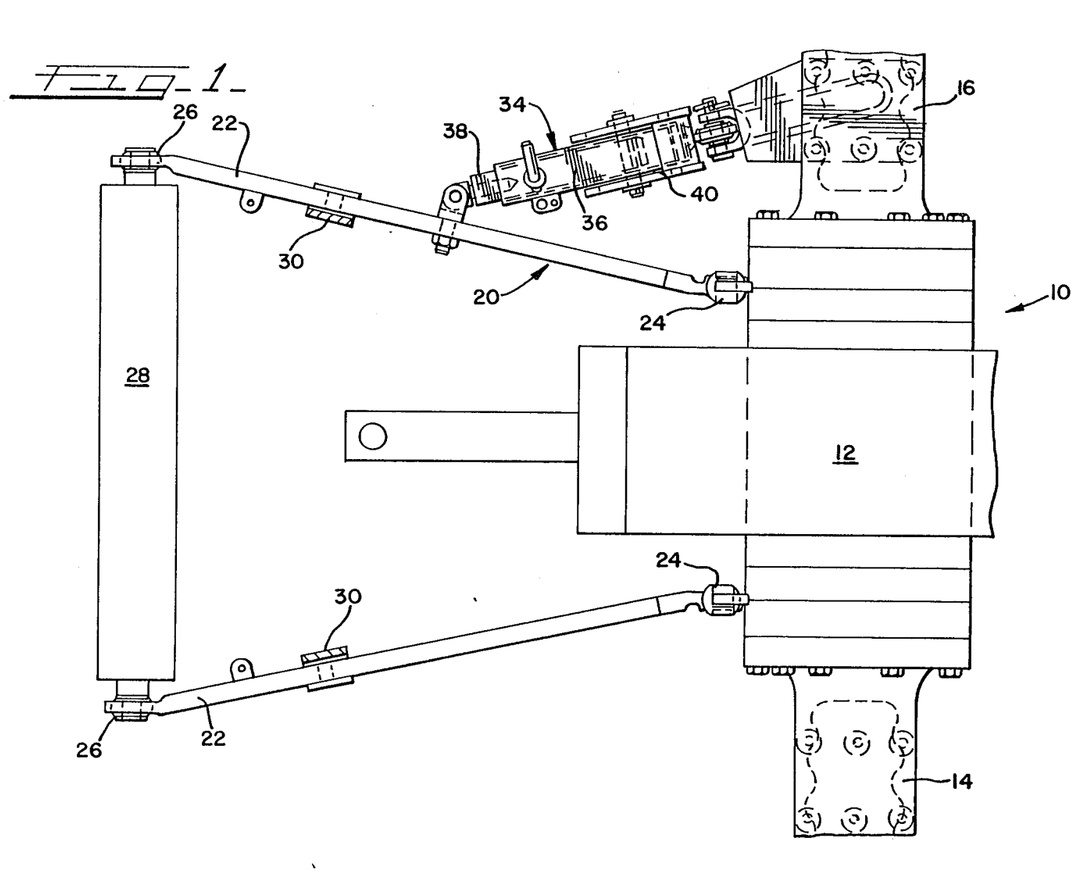
FIG. 1 is a fragmentary top plan view of a conventional tractor equipped with a hitch structure incorporating sway limiting means according to the present invention.

Referring now to FIG. 1, there is shown a rear section of a tractor type vehicle. Since the invention herein disclosed is adaptable for use with a variety of conventional type tractors, the particular vehicle which the present invention is illustrated as being associated is depicted only fragmentarily and is seen as represented in its entirety by reference number 10. As shown, tractor 10 has a main frame or chassis 12 which includes a right-hand axle section 14 and a left-hand axle section 16.

A tractor hitch assembly 20 is mounted on the main frame 12. Tractor hitch assembly 20 includes a pair laterally spaced lower draft links 22. Since the lower draft links are mirror images of each other, any description hereafter of one link, and components associated therewith, will also pertain to the other link.

Draft links 22 are each connected at their forward ends to the tractor frame by means of a ball and socket joint 24. By virtue of this type of connection, links 22 are capable of both vertical and lateral swinging movements. Ball and socket joint 24 permits vertical movement of each draft link 22 about a transverse axis between a lower operative position and an upper transport position. Ball and socket joint 24 further permits lateral sway or side-to-side movement of the associated link in a plane passing through the axis.

Draft links 22 each in turn extend rearwardly from their connection with the tractor and diverge outwardly from one another. The rearward ends of the draft links may also be provided with similar ball and socket joints 26 to accommodate attachment of an agricultural implement such as a plow 28.

When the agricultural implement attached to the tractor is a plow or the like, it is frequently necessary to raise and lower the links 22 either for the purpose of lifting the implement from the ground or for determining the depth at which it will operate. Therefore, each link 22 receives the lower end of a lift link 30. The upper ends of lift links 30 are connected with a power lift system (not shown) of the tractor which regulates the vertical disposition of links 22 and, thereby, the implement 28.

Turning now to the present invention, horizontal or side-to-side movement of the draft links 22 is controlled by sway limiting means 34. In its preferred form, the sway limiting means 34 of the present invention is disposed between the tractor frame 12 and either one of the draft links 22. Sway limiting means 34 includes a linkage assembly comprised of a pair of links 36, 38 which coact with cam means 40 to limit lateral sway of the implement 28.

Figures 2, 3, 4:
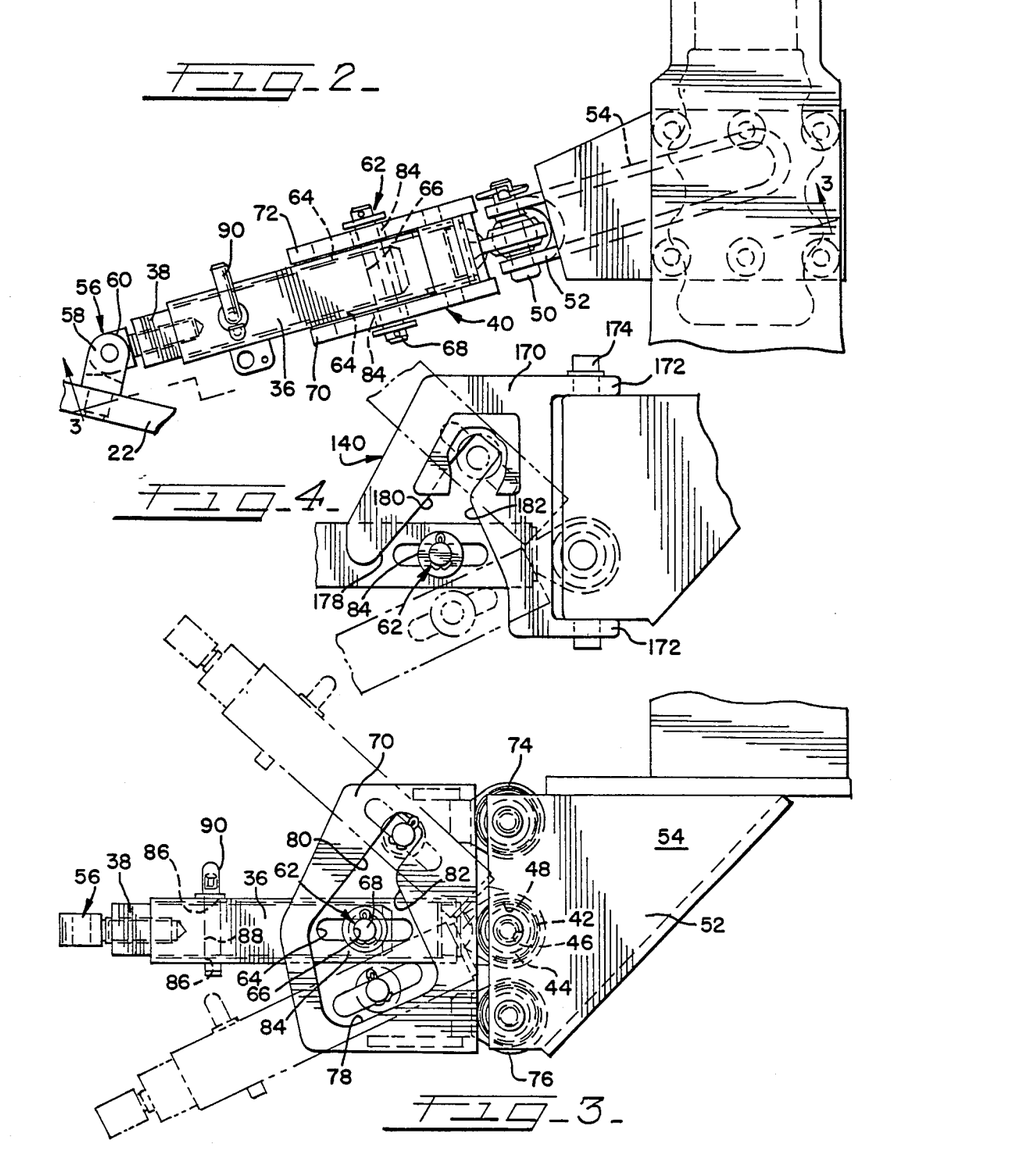
FIG. 2 is an enlarged top plan view of the sway limiting means of FIG. 1.
FIG. 3 is a side elevational view taken along line 3—3 of FIG. 2.
FIG. 4 is a side elevational view of a modified sway limiting means according to the present invention.

Links 36 and 38 are movable through a limited range relative to each other and are lengthwise arranged telescopically one within the other As illustrated in FIG. 2, link 36 is operatively coupled to tractor 10 and link 38 is operatively coupled to a draft link 22. The operative coupling between link 36 and tractor 10 includes a ball and socket joint 42 which permits substantially universal movement of link 36 relative to tractor 10.

Turning to FIG. 3, ball and socket joint 42 is of a well known type consisting preferably of a ball 44 defining a diametrical bore 46 and which is held rotatably captive in a substantially annular socket 48. A bolt 50 or other suitable fastener passes through bore 46 between parallel plates 52 constituting parts of a bracket 54 which, in turn, is rigidly secured to the frame of the tractor.

A multi-piece articulated coupling 56 operatively connects link 38 to draft link 22. In its preferred form, coupling 56 includes a clevis 58 swivably secured to link 22 and an adjustable member 60 which is articulately connected to clevis 58. Member 60 axially extends from one end of link 38 and is threadably accommodated for endwise adjustment relative thereto.

Links 36 and 38 are interconnected for a limited range of movement relative to each other by limit means 62. Preferably, link 36 defines two diametrically opposed, axially extending slots 64. Link 38 defines a diametric hole or aperture 66. An elongated pin 68 passes through the slots 64 and through the aperture 66 to form a pin and slot arrangement which limits telescopic extension of one link relative to the other link.

As illustrated, cam means 40 includes a pair of bifurcated arms 70 and 72 which embrace link 36. Cam means 40 is connected to bracket 54 by ball and socket joints 74 and 76. Joints 74 and 76 allow cam means 40 to move conjointly with movement of links 36 and 38.

Cam means 40 defines a closed and elongated slot 78 which receives and coacts with limit means 62 to limit sway of the associated draft link 22. Opposite sides 80 and 82 of slot 78 converge in an upward vertical direction and define cam surfaces. Opposite ends of elongated pin 68 are provided with bushings 84 which are adapted to engage and coact with cam surfaces 80 and 82 in controlling lateral sway of draft link 22.

The preferred spacing between cam surfaces 80 and 82 being such that when draft link 22 is disposed susbtantially horizontal the extent of lateral sway is limited both by the lateral spacing between cam surfaces 80, 82 and the length of slots 64. When draft link 22 is lowered beneath a horizontal position, toward its lower operative position, the extent of lateral or side sway is limited only by the length of slots 64. On the other hand, when draft link 22 is raised above a horizontal disposition, cam surfaces 80, 82 control the extent of lateral sway. Cam surface 80 controls lateral displacement of draft link 22 in one lateral direction while cam surface 82 controls lateral displacement of draft link 22 in the opposite lateral direction.

The sway limiting apparatus 34 may further include means for selectively locking links 36 and 38 to each other. Axially spaced from slots 64, link 36 further defines two diametrically opposed holes or apertures 86. Link 38 further defines a diametrical hole or aperture 88 which is axially spaced from aperture 66. When holes 86 and 88 are aligned, a linchpin 90 is inserted therethrough for securing the links 36 and 38 to each other.

FIG. 4 illustrates a modified form of cam means 140. For purposes of simplicity and clarity, those elements which are the same as that described above are referred to by like reference numerals.

Cam means 140 includes a pair of bifurcated arms 170 which are joined by a pair of vertically spaced flanges 172. Flanges 172 embrace upper and lower surfaces of an axle housing. Moreover, flanges 172 journal a vertically elongated pin 174 which passes through flanges 172 and through the axle housing to permit rotational movement of the cam means 140 about the vertical axis of pin 174.

Each arm 170 of cam means 140 defines an open and vertically elongated slot 178 which receives and coacts with limit means 62 of the sway limiting means 34 to limit sway of the associated draft link 22. Opposite sides 180 and 182 of slot 178 converge in an upward vertical direction and define cam surfaces. As in the first embodiment, bushings 84 on pin 68 are adapted to engage and coact with the cam surfaces 180 and 182. By such construction, cam surface 180 controls lateral displacement of draft link 22 in one direction while cam surface 182 controls lateral displacement of draft link 22 in the opposite lateral direction.

Referring now to FIGS. 5 through 8, there is illustrated a modified form of sway limiting apparatus. For purposes of simplicity and clarity, those elements which are the same as that described above are referred to by like reference numerals.

Figure 5:
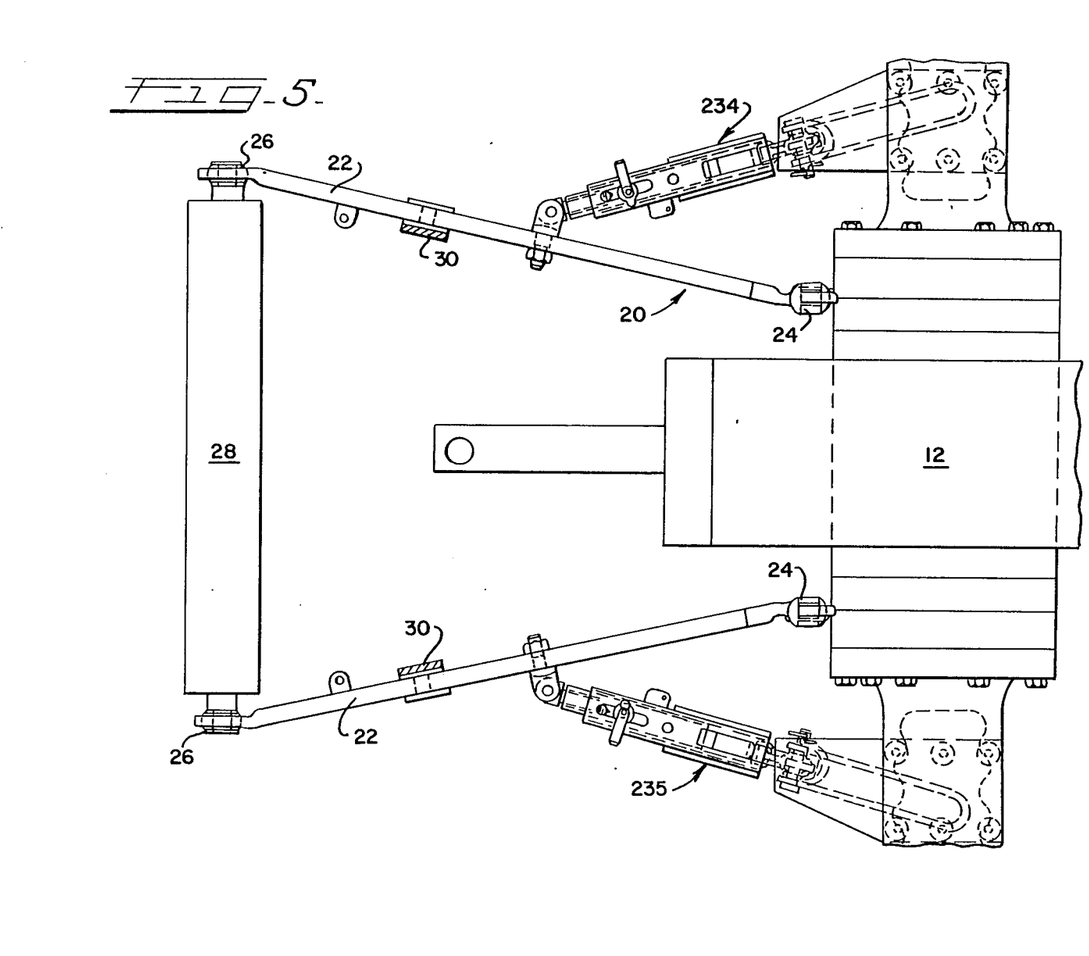
FIG. 5 is fragmentary top plan view of a conventional tractor equipped with a hitch structure incorporating another modified form of sway limiting means.

This modified form of sway limiting apparatus includes a pair of stabilizer assemblies 234 and 235. One stabilizer assembly is connected between the tractor frame 12 and each draft link 22. Since the stabilizer assemblies are mirror images of each other, any description hereafter of one stabilizer assembly, and components associated therewith, will also pertain to the other stabilizer assembly.

Figure 6:
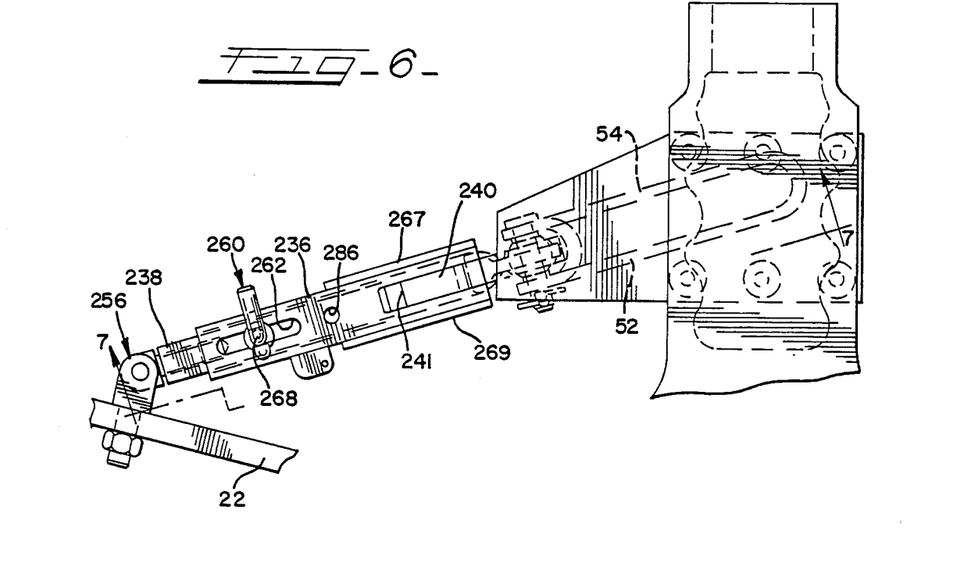
FIG. 6 is an enlarged top plan view of the sway limiting means illustrated in FIG. 5.

As best illustrated in FIG. 6, each stabilizer assembly comprises an elongated tubular sleeve 236 having an arm 238 telescopically slidable within and relative to the sleeve 236. Sleeve 236 and arm 238 are movable through a limited range relative to each other and are lengthwise arranged between the tractor and a draft link 22.

As illustrated, sleeve 236 is operatively coupled to tractor 10 and arm 238 is operatively coupled to draft link 22. The operative coupling between sleeve 236 and tractor 10 includes a ball and socket 242 which permits substantial universal movement of sleeve 236 relative to tractor 10. The ball and socket joint 242 may be substantially similar to the ball and socket joint 42 described above. As such, no further description need be provided therefor.

Figure 7:
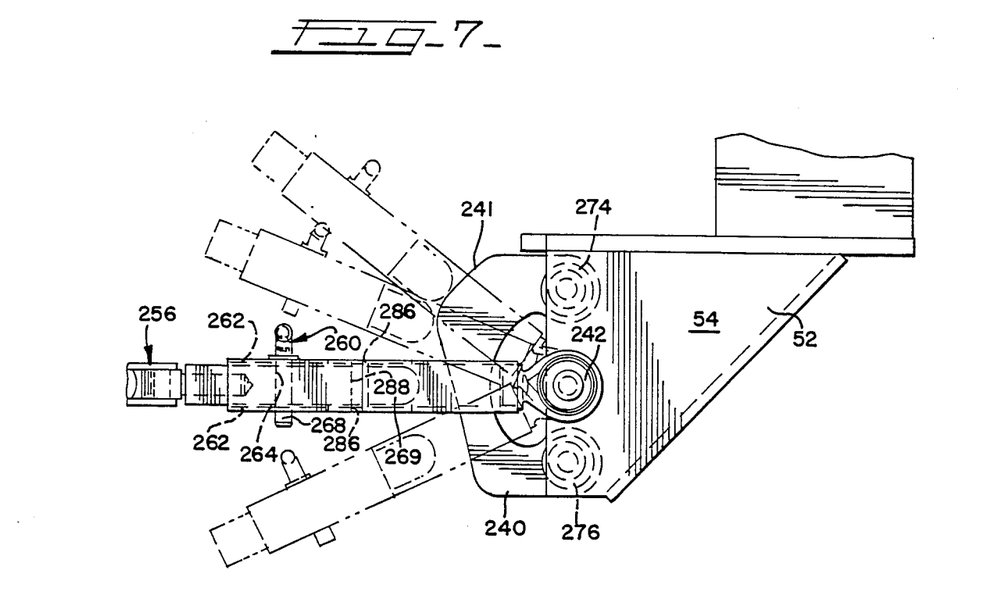
FIG. 7 is a side elevational view taken along line 7—7 of FIG. 6.

A multi-piece articulated coupling 256 operatively connects arm 238 to draft link 22. The form of coupling 256 may be substantially similar to coupling 54 described above. Thus, no further description need be provided therefor Tubular sleeve 236 and arm 238 are interconnected for a limited range of movement relative to each other by limit means 260. Preferably, sleeve 236 defines two diametrically opposed, axially extending slots 262. Arm 238 defines a diametrical hole or aperture 264. A linchpin 268 passes through the slots 262 and through the aperture 264 to form a pin and slot arrangement which limits telescopic extension of sleeve 236 relative to arm 238. As best illustrated in FIG. 7, the forward or inner end of arm 238 is provided with an arcuate profile.

Intermediate its ends, sleeve 236 defines a pair of spaced apart, axially extending arms 267 and 269. Cam means 240 having a peripheral cam surface 241 extends between arms 267 and 269 of sleeve 236 and coacts with the arcuate end of arm 238 to limit lateral sway of the associated draft link 22.

Cam means 240 is connected to the tractor by ball and socket joints 274 and 276 which permit cam means 240 to follow the movement of the associated sway limiting apparatus. Ball and socket joints 274 and 276 may be of substantially similar structure to joint 42 described in detail above. Thus, no further detail need be provided for.

Each sway limiting apparatus may further include means for selectively locking the tubular sleeve 236 and arm 238 to each other to prevent lateral sway of the links 22 in their operative position. Axially spaced from slots 262, tubular sleeve 236 further defines two diametrically opposed apertures 286. Arm 238 also defines a diametric hole or aperture 288 which is axially spaced from aperture 264. When holes 286 and 288 are in alignment, the linch-pin 268 is inserted therethrough for securing the links to each other thereby preventing relative movement therebetween.

Figure 8:
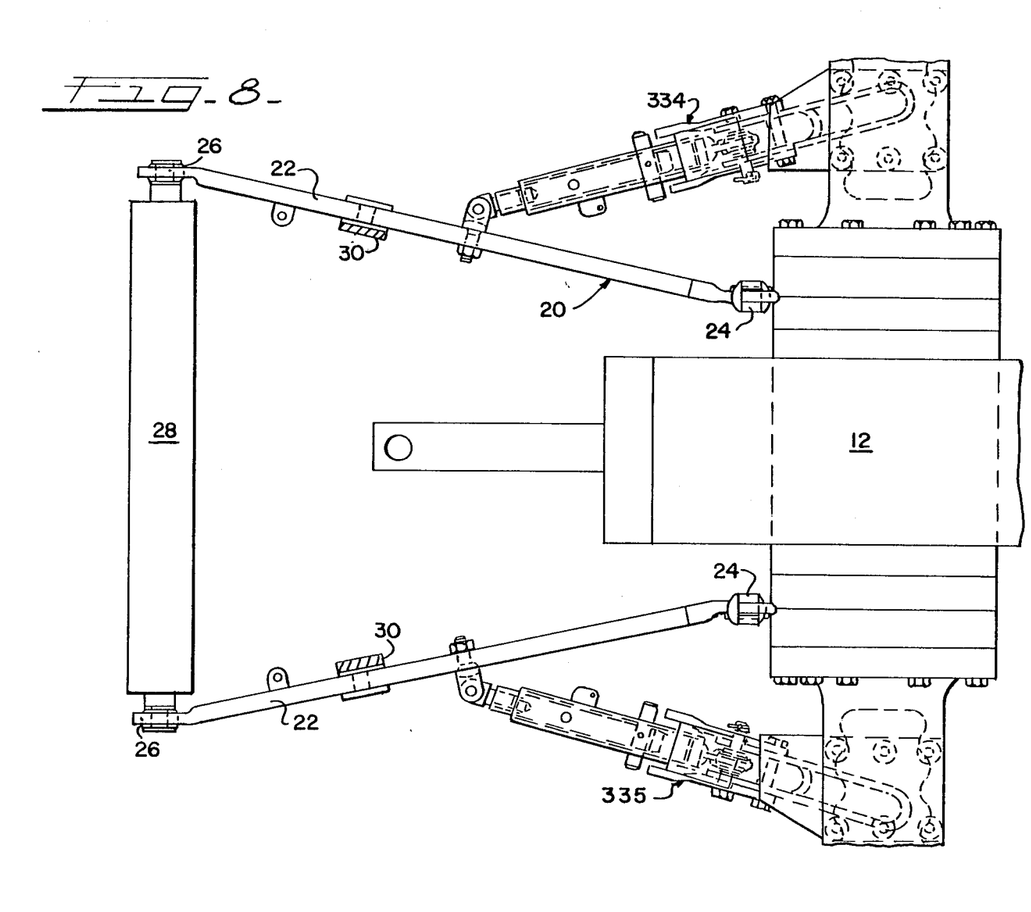
FIG. 8 is a fragmentary top plan view of a conventional tractor equipped with a hitch structure incorporating another modified form of sway limiting means.
Figure 9:
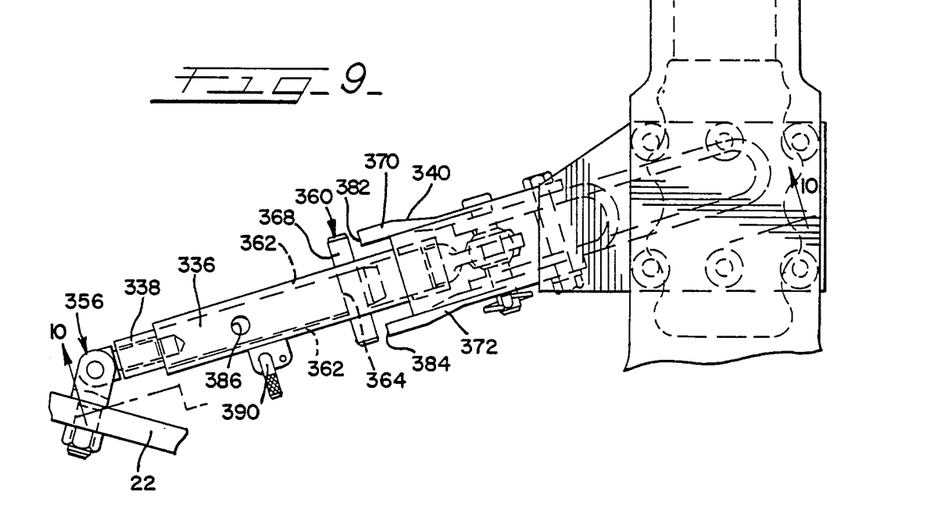
FIG. 9 is an enlarged top plan view of the sway limiting means of FIG. 8.
Figure 10:
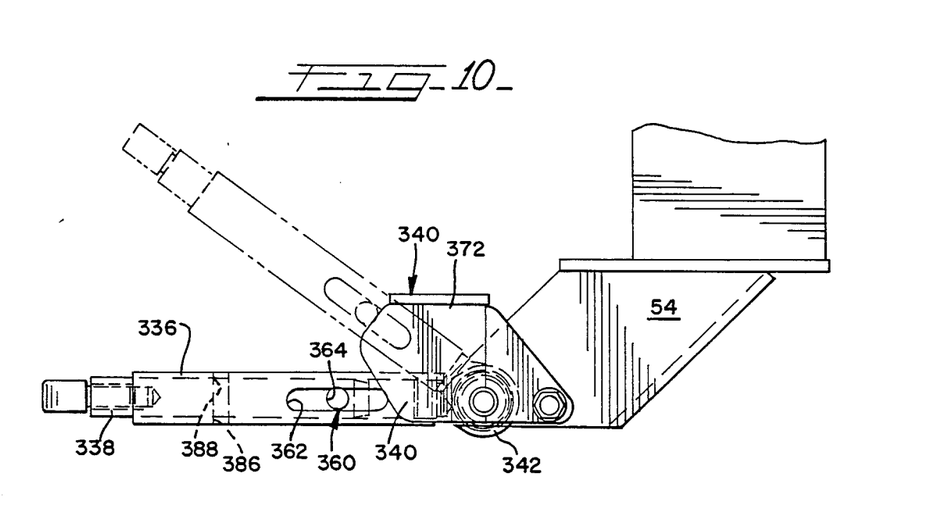
FIG. 10 is a side elevational view taken along line 10—10 of FIG. 9.

Referring now to FIGS. 8 through 10, there is illustrated another form of a sway limiting apparatus. For purposes of simplicity and clarity those elements which are the same as that described above are preferred to by like reference numerals.

This modified form of sway limiting apparatus includes a pair of stabilizer assemblies 334 and 335. One stabilizer assembly is connected between the tractor frame 12 and each draft link 22. Since the stabilizer assemblies are mirror images of each other, any description hereafter of one stabilizer assembly, and components associated therewith, will also pertain to the other stabilizer assembly.

Each stabilizer assembly is connected to and between the tractor and one draft link 22. As illustrated in FIG. 9, each stabilizer assembly includes an elongated sleeve 336, an arm 338 slidably within and relative to the sleeve 336 and cam means 340.

As illustrated in FIG. 9, one end of sleeve 336 is connected to bracket 54 and tractor frame 12 through a ball and socket joint 342. Joint 342 permits substantially universal movement of the stabilizer assembly relative to the tractor. Joint 342 may be of substantiallly similar structure to that described above regarding joint 42. As such, no further description need be provided therefor.

At its other end, each stabilizer assembly is connected to a draft link 22 through a multi-piece, articulated coupling 356. Coupling 356 may be substantially similar to coupling 56 described above. Therefore, no further description need be provided therefor.

Sleeve 336 and arm 338 are interconnected for a limited range of movement relative to each other by limit means 360. Preferably, sleeve 336 defines two diametrically opposed, axially extending slots 362. Arm 338 defines a diametric hole or aperture 364. An elongated pin 368 passes through the slots 362 and aperture 364 to form a pin and slot arrangement which limits telescopic extension of sleeve 336 relative to arm 338.

Cam means 340 is connected to the tractor frame 12 and includes a pair of bifurcated arms 370 and 372. Outer edges 382 and 384 provided on arms 370 and 372, respectively, define peripheral cam surfaces. Cam surfaces 382 and 384 coact with opposite ends of pin 368 to control lateral displacement of the associated draft link 22.

Each sway limiting apparatus may further include means for selectively locking tubular sleeve 336 and arm 338 to each other. Axially spaced from slots 362, sleeve 336 further defines two diametrically opposed holes or apertures 386. Arm 338 further defines a diametric hole or aperture 388 which is axially spaced from hole 366. When holes 386 and 388 are aligned, a linchpin 390 is inserted therethrough for securing the sleeve 336 and arm 338 together.

In operation, the sway limiting apparatus of the present invention allows lateral movement of an associated draft link in its lower operative position and prevents sway of the draft link in its upper transport position. To effect such ends, the cam surface defined by the cam means of the sway limiting apparatus is designed to permit telescopic movement between the elements of the linkage assembly when the agricultural implement is in its lower operative position. When moved to its upper transport position, the cam surface on the cam means coacts with the linkage assembly to automatically and effectively prevent relative movement between the elements of the linkage assembly. As such, the linkage assembly is effectively locked thereby preventing lateral sway of the associated draft link. Because the profiled cam surface on the cam means automatically limits lateral sway of the draft link, the tractor operator is no longer required to leave the operator's station to lock or unlock the sway limiting apparatus.

To allow the implement to follow the tractor, the sway limiting apparatus of the present invention further allows the elements of the linkage assembly to be selectively locked to each other. By locking the elements of the linkage assembly to each other, no lateral sway of the implement will result even when disposed in its lower operative position. As such, the implement will follow the tractor.

Even with the standards which are set by the industry, there may be occasions when it is desirable or required to use an "odd" agricultural implement. Such "odd" agricultural implements vary in length. As such, the lateral spacing between draft links varies depending upon the length of the implement. The adjustable coupling between the sway limiting apparatus and the draft link allows the effective length of the sway limiting apparatus to be adjusted to compensate for such "odd" agricultural implements. Moreover, the adjustable coupling allows "off-set" positioning of the implement relative to the center line of the tractor if such an arrangement is so desired by the operator.

Thus, there has been described numerous modifications of variations which can be affected without departing from the true spirit and novel scope of the present invention. It will be appareciated that the present disclosure is intended as an exemplification of the invention, and is not intended to limit the invention to the specific embodiment illustrated. The disclosure is intended to cover by the appended claims and all such modifications as fall within the scope of the claims.

What is claimed:

1. Sway limiting means for a tractor hitch having a draft link mounted on a tractor frame for vertical movement about a transverse axis between a lower operative position and an upper transport position and for lateral sway in a plane passing through said axis, said sway limiting means being disposed between said tractor and said draft link comprising:

a linkage assembly including a pair of links which are movable through a limited range relative to each other and are lengthwise arranged telescopically one within the other, one link being connected to said draft link and the other link being connected to said tractor; and cam means connected to said tractor and defining a cam surface which cooperates with said linkage assembly to allow relative telescopic movement between said links and thereby allow lateral movement of said draft link in its lower operative position and prevents relative telescopic movement between said links and thereby automatically prevents lateral movement of said draft link in response to movement f said draft link to its upper transport position.

2. The sway limiting means of claim 1 further includes means for selectively locking said links of said linkage assembly to each other in a manner preventing lateral movement of said draft link in its lower operative position.

3. The sway limiting means of claim 1 wherein said linkage assembly further includes limiting means for interconnecting said links and limiting their lengthwise movement relative to each other.

4. The sway limiting means of claim 3 wherein said cam means defines an elongated vertical slot which receives and coacts with said limiting means to limit lateral sway of said draft link, with opposite sides of said slot defining said cam surface.

5. The sway limiting means of claim 1 wherein said cam means includes a pair of bifurcated arms which are pivotally connected to said tractor each arm defining an elongated vertical slot with opposite sides of which define said cam surface.

6. The sway limiting means of claim 5 wherein said arms define a closed elongated slot opposite sides of which converge in an upward vertical direction.

7. The sway limiting means of claim 5 wherein said arms define an open elongated slot opposite sides of which converge in an upward vertical direction.

8. The sway limiting means of claim 1 wherein said cam means is connected to said tractor by a ball and socket.

9. The sway limiting means of claim 1 wherein said other link is connnected to said tractor by a ball and socket.

10. The sway limiting means of claim 1 wherein said linkage assembly includes pivotal attachment means disposed at one end of one of said links for effecting fine adjustment of the length of said linkage assembly.

11. A sway limiting apparatus arranged in combination with a hitch mechanism to connect an agricultural implement to a tractor, said hitch mechanism including a pair of laterally spaced draft links which are connected to the tractor to accomodate both lateral and swinging movements of the links relative to the tractor about a transverse axis between a lower operative position and an upper transport position, said sway limiting apparatus comprising:

a pair of stabilizer assemblies, with each stabilizer assembly being connected to and between said tractor and one of said draft links, each stabilizer assembly comprising an elongated tubular sleeve having an arm telescopically slidable within and relative to said sleeve, and cam means connected to said tractor and defining a cam surface which coacts with said arm to allow relative telescopic movement between said sleeve and arm and thereby allow lateral movement of a draft link in its lower operative position and prevents relative telescopic movement between said sleeve and said arm and thereby prevents lateral sway of a draft link in response to movement of said draft link toward its upper transport position.

12. The sway limiting apparatus of claim 11 wherein each stabilizer assembly further includes means for limiting telescopic movement of said arm relative to said sleeve.

13. The sway limiting apparatus of claim 11 further includes means for selectively locking said arm and said elongated sleeve to each other in a manner preventing lateral movement of the draft link in its lower operative position.

14. The sway limiting apparatus of claim 11 wherein a ball and socket arrangement connects said cam means to said tractor.

15. The sway limiting apparatus of claim 11 wherein the arm of each stabilizer assembly has an accurate shaped end which moves along the cam surface of said cam means when said draft link is moved from its lower position to its upper position.

16. The sway limiting apparatus of claim 11 wherein each stabilizer assembly includes means for adjusting said sway limiting apparatus to prevent said arm from binding on said cam surface when an odd length agricultural implement is connected to said tractor.

17. A sway limiting apparatus arranged in combination with a hitch mechanism of an agricultural tractor, said hitch mechanism including a pair of laterally spaced draft links which are connected to the tractor to accomodate both lateral and swinging movements of the links relative to the tractor about an axis, each link being movable between a lower operative position and an upper transport position, said sway limiting apparatus comprising:

a pair of stabilizer assemblies, with each stabilizer assembly being connected to and between said tractor and one of said draft links, each stabilizer assembly comprising an elongated tubular sleeve and an arm slidable within and relative to said sleeve;

means for limiting relative sliding movement between said sleeve and said arm; and cam means defining a peripheral cam surface which cooperates with said limiting means to allow relative telescopic movement between said sleeve and arm thereby permitting lateral movement of said draft link in its lower operative position and prevents relative telescopic movement between said sleeve and arm thereby preventing sway of said draft link in its upper transport position.

18. A sway limiting apparatus according to claim 17 wherein each stabilizer assembly includes means for selectively locking said arm and said tubular sleeve to each other in a manner preventing lateral movement of the draft link in its lower operative position.

19. A sway limiting apparatus according to claim 17 wherein said cam means includes a pair of bifurcated arms which are connected to said tractor, each arm defining a cam surface on a peripheral edge thereof.

20. A sway limiting apparatus according to claim 19 wherein said limiting means includes an pin carried by said arm and passing through a lengthwise elongated slot defined by said tubular member, opposite ends of said pin cooperating with said cam surfaces to prevent sway of said draft link in its upper transport position.

21. A sway limiting apparatus according to claim 17 wherein each stabilizer assembly is connected to said tractor by a ball and socket arrangement.

22. A sway limiting apparatus according to claim 17 wherein at least one stabilizer assembly includes means for selectively locking said tubular sleeve and said arm to each other in a manner preventing lateral movement of the draft link in its lower operative position.

* * * * *